United States Patent
Bouchard et al.

(10) Patent No.: US 10,102,478 B2
(45) Date of Patent: Oct. 16, 2018

(54) DISTRIBUTED AND PRIVACY-PRESERVING PREDICTION METHOD

(71) Applicant: Conduent Business Services, LLC, Dallas, TX (US)

(72) Inventors: Guillaume Bouchard, Saint-Martin-le Vinoux (FR); Julien Perez, Grenoble (FR); James Brinton Henderson, Vessy (CH)

(73) Assignee: Conduent Business Services, Inc. TX (US)

( * ) Notice: Subject to any disclaimer, the term of this patent is extended or adjusted under 35 U.S.C. 154(b) by 627 days.

(21) Appl. No.: 14/752,129

(22) Filed: Jun. 26, 2015

(65) Prior Publication Data

US 2016/0379128 A1   Dec. 29, 2016

(51) Int. Cl.
| | |
|---|---|
| *G06N 7/00* | (2006.01) |
| *G06N 99/00* | (2010.01) |
| *G06F 21/62* | (2013.01) |
| *H04W 4/21* | (2018.01) |
| *H04L 29/08* | (2006.01) |

(52) U.S. Cl.
CPC ......... *G06N 7/005* (2013.01); *G06F 21/6263* (2013.01); *G06N 99/005* (2013.01); *H04W 4/21* (2018.02); *H04L 67/104* (2013.01)

(58) Field of Classification Search
CPC ...... G06N 7/005; G06N 99/005; G06F 21/00; G06F 21/6245; G06F 21/6254; H04L 63/00; H04L 67/104
See application file for complete search history.

(56) References Cited

U.S. PATENT DOCUMENTS

| | | | |
|---|---|---|---|
| 8,775,335 B2 * | 7/2014 | Lin | G06Q 30/02 706/12 |
| 2016/0182222 A1 * | 6/2016 | Rane | H04L 9/008 713/168 |

OTHER PUBLICATIONS

Li Wan, Wee Keong Ng, Shuguo Han, and Vincent C. S. Lee, "Privacy-Preservation for Gradient Descent Methods", 2007, KDD'07, pp. 775-783.*

Srujana Merugu and Joydeep Ghosh, "Privacy-preserving Distributed Clustering using Generative Models", 2003, Proceedings of the Third IEEE International Conference on Data Mining (ICDM'03), pp. 1-8.*

(Continued)

*Primary Examiner* — Kakali Chaki
*Assistant Examiner* — Ying Yu Chen
(74) *Attorney, Agent, or Firm* — Fay Sharpe LLP

(57) ABSTRACT

Each computer of a peer-to-peer (P2P) network performs an iterative computer-based modeling task defined by a set of training data including at least some training data that are not accessible to the other computers of the P2P network, and by a set of parameters including a shared parameter. The modeling task optimizes an objective function comparing a model parameterized by the set of parameters with the training data. Each iteration includes: performing an iterative gradient step update of parameter values stored at the computer based on the objective function; receiving parameter values of the shared parameter from other computers of the P2P network; adjusting the parameter value of the shared parameter stored at the computer by averaging the received parameter values; and sending the parameter value of the shared parameter stored at the computer to other computers of the P2P network.

18 Claims, 3 Drawing Sheets

(56) References Cited

OTHER PUBLICATIONS

Martin Burkhart, Mario Strasser, Dilip Many, and Xenofontas Dimitropoulos, "SEPIA: Privacy-Preserving Aggregation of Multi-Domain Network Events and Statistics", 2010, Usenix The Advanced Computing Systems Associations, pp. 1-7.*

Sunil Kumar Gupta, Dinh Phung, Brett Adams, and Svetha Venkatesh, "A Matrix Factorization Framework for Jointly Analyzing Multiple Nonnegative Data Sources", 2014, ResearchGate, pp. 1-11.*

Argyriou, et al., "Convex multi-task feature learning," Advances in Neural Information Processing Systems, vol. 19, pp. 243-272 (Jan. 2008).

Collobert, et al., "A Unified architecture for natural language processing: Deep neural networks with multitask learning," Intl' Conference on Machine Learning, pp. 1-9 (2008).

Klimt, et al., "The Enron Corpus: A New Dataset for Email Classification Research," ECML, vol. 3201, Lecture Notes in Computer Science, pp. 217-226 (2004).

Nedic, et al., "Distributed Subgradient Methods for Multi-agent Optimization," Automatic Control, IEEE Transactions on, vol. 54(1), pp. 1-28 (2009).

\* cited by examiner

DISTRIBUTED AND PRIVACY-PRESERVING PREDICTION METHOD

BACKGROUND

The following relates to the modeling arts, prediction arts, machine learning arts, recommendation system arts, and related arts.

A computer-based modeling system typically entails two operations: training a mathematical representation (model) of an apparatus, operation, system, or other object; and using the trained model to predict or simulate activity, characteristics, or other features of the modeled object. By way of some illustrative examples, in a recommendation system for use in an online retail website the goal is to predict a user's interest in retail merchandise in order to generate personalized product recommendations or advertisements for the user. In one known approach, the recommendation system employs nonnegative matrix factorization (NMF) of a user-item matrix, in which the matrix elements identify items of actual interest to users (based on actual purchases, or based on item web page views, et cetera). NMF decomposes the user-item matrix into factor matrices of lower-rank that cluster together similar items and users. As another illustrative example, in a computer-based medical diagnostic system the goal may be to associate a medical diagnosis with a set of symptoms. NMF can be applied to a diagnosed patient-symptoms matrix to associate typical symptoms to a diagnosis, or to associate a diagnosis to a set of symptoms. In general, the useful output of computer based modeling may be a prediction, e.g. predicting an item likely to be of interest to a user, or may be a data mining output, e.g. discovering data correlations or anti-correlations. As an example of a discovery process, a set of documents may be processed based on content (e.g. using "bag-of-words" representations) to classify the documents for indexing/archival purposes.

Computer based modeling relies upon having a sufficiently large and representative set of training data to generate an accurate model. The trend toward "big data" illustrates this, as organizations endeavor to leverage large internal databases (in the case of a large corporation, government, or the like) or external databases (e.g. the public Internet) to produce complex models for diverse purposes. The quality of these data sets varies. For example, corporate databases may contain vast quantities of data, but the data may be systematically biased based on the product portfolio of the corporation, or the geographical region in which the corporation operates, or so forth. The public Internet provides large quantities of data, but is limited to public information personalized data such as medical diagnoses, credit card purchases, and so forth is generally not publically available.

The so-called "deep web" is the portion of the Internet that is not public. The deep web includes password-protected websites, encrypted private websites, local area networks connected to the Internet by firewalls or other security, and so forth. The deep web contains private data such as medical records, retail purchase records, proprietary survey results, and so forth. These data would be useful for many computer-based modeling tasks, especially if the data from various parts of the deep web could be merged together to form large and diverse training data sets. However, private data on the deep web typically cannot be made publicly available due to personal privacy, confidentiality, and/or proprietary concerns.

One known approach for overcoming this difficulty is the use of smaller-scale collaborations, such as partnerships or consortiums of two, three, or more organizations, whose members agree to share data on some contractually defined basis. Even on these smaller scales, however, data sharing may be hindered by privacy concerns, and/or by an unwillingness to expose private data to potential competitors. Partnerships or consortiums still limit the amount of deep web data that can be merged, to those data belonging to the member organizations, and still further to that sub-set of data those organizations are willing to share.

Data anonymization is another tool for facilitating data sharing. This approach is commonly used in medical research, by removing identifying information such as name, address, and so forth before sharing the data. However, the information removed in order to make the data anonymous can greatly reduce the value of the data. For example, removing address information can hinder disease outbreak geographical modeling. On the other hand, if too little information is removed then the data may not be sufficiently anonymous, leading to patient privacy concerns. Data anonymization of more "free-form" data formats, such as electronic mail (email) messages, can be difficult to automate—for example, in an email message it may be straightforward to automatically strip sender and recipient header information, but it is also necessary to parse the body of the email to identify and anonymize information such as personal names, company names, location names, and so forth. Automatic anonymization of free-form data can be error-prone, again leading to privacy concerns. A further problem is that even in anonymized form the owner of the data may be unwilling to expose it to the public—for example, anonymized medical data may provide a medical company with a substantial competitive advantage it is unwilling to relinquish.

Computing capacity is another concern in leveraging big data sets in computer-based modeling. Even if a consortium is able to overcome the various data sharing hurdles, the resulting enormous mutually shared data set may be too large for the computing capacity of any single member to effectively process. An apparent solution to this is to combine the computing capacities of the consortium members, but there are difficulties. The different members of the consortium may be dealing with different computer-based modeling tasks, and they may be unwilling to commit limited computing resources to solving tasks of other members of the consortium. Sharing computing resources also may require sharing computer code or other task-specific information which the various members may wish to keep confidential or proprietary (even if they are willing to share some of the underlying training data).

BRIEF DESCRIPTION

In some embodiments disclosed herein, a disclosed non-transitory storage medium stores instructions executable by a local computer to perform iterative computer-based modeling in conjunction with an electronic communication system configured to send parameter values of shared parameters from the local computer to remote computer-based modeling systems and to receive at the local computer parameter values of the shared parameters from remote computer-based modeling systems. The iterative computer-based modeling includes the operations of: performing a gradient step to update parameter values of a set of parameters including at least parameter values of the shared parameters stored at the local computer, the iterative gradient step updates operating to optimize an objective function that is functionally dependent upon the set of parameters wherein the objective function quantitatively compares a model with a set of training data including at least some training data accessible by the local computer that are not accessible by the remote computer-based modeling systems; adjusting the parameter values of the shared parameters stored at the local computer by averaging parameter values of the shared parameters received at the local computer from remote computer-based modeling systems via the electronic communication system; and sending the parameter values of the shared parameters stored at the local computer from the local computer to remote computer-based modeling systems via the electronic communication system.

In some embodiments disclosed herein, a computer-based modeling system comprises a plurality of computers interconnected as a peer-to-peer (P2P) network by an electronic communication system configured to send parameter values of shared parameters between sender and recipient computers of the P2P network. Each computer of the P2P network is programmed to perform an iterative computer-based modeling task defined by a set of training data including at least some training data that are not accessible to the other computers of the P2P network, and by a set of parameters including one or more shared parameters. The iterative computer-based modeling task optimizes an objective function that quantitatively compares a model parameterized by the set of parameters with the set of training data. Each iteration of the iterative computer-based modeling task includes: performing an iterative gradient step update of parameter values of the set of parameters stored at the computer based on the objective function; receiving parameter values of the one or more shared parameters of the set of parameters from other computers of the P2P network via the electronic communication system; adjusting the parameter values of the one or more shared parameters stored at the computer by averaging the received parameter values of the one or more shared parameters; and sending the parameter values of the one or more shared parameters stored at the computer to other computers of the P2P network via the electronic communication system.

In some embodiments disclosed herein, a method is disclosed, which is performed in conjunction with a plurality of computers interconnected as a peer-to-peer (P2P) network. The method comprises, at each computer of the P2P network, performing an iterative computer-based modeling task using the computer to optimize an objective function that quantitatively measures the fit of a model parameterized by a set of parameters including one or more shared parameters to a set of training data including at least some training data not accessible by the other computers of the P2P network. Each iteration of the iterative computer-based modeling task includes: performing an iterative gradient step update of parameter values of the set of parameters stored at the computer to improve the fit of the model to the set of training data as measured by the objective function; receiving parameter values of the one or more shared parameters from other computers of the P2P network; after performing the iterative gradient step update, adjusting the parameter values of the one or more shared parameters stored at the computer by averaging the received parameter values of the one or more shared parameters; and after performing the adjusting, sending the parameter values of the one or more shared parameters stored at the computer to other computers of the P2P network.

DETAILED DESCRIPTION

Figure 1:
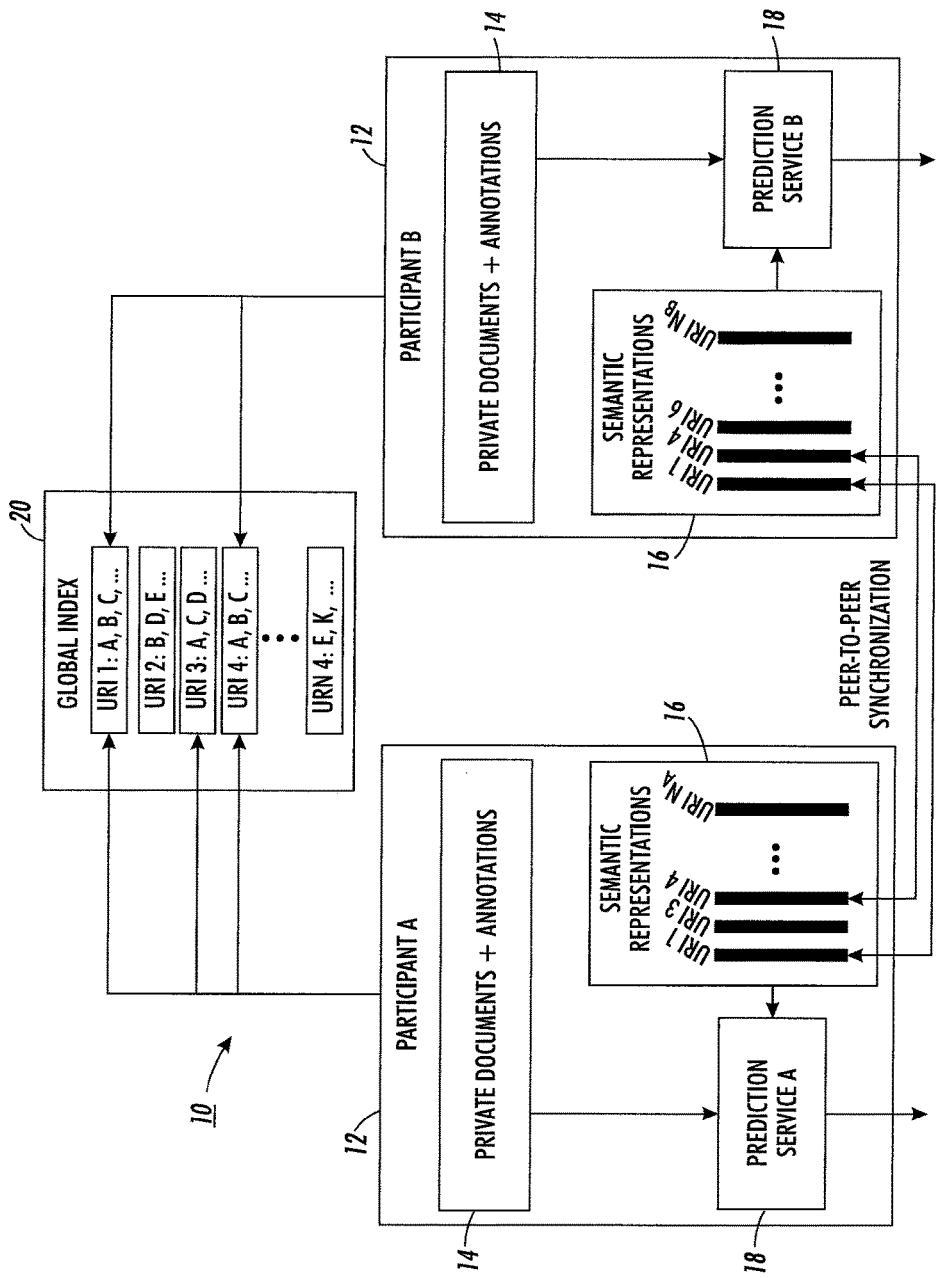
FIG. 1 diagrammatically illustrates a computer-based modeling peer-to-peer (P2P) network including illustration of two representative participants in the P2P network.

In approaches disclosed herein, the difficulties involved with the sharing of private data, as discussed previously, are overcome by not sharing the private data but instead sharing model parameters derived from the private data. This approach recognizes that some (but not necessarily all) model parameters generated during computer-based modeling represent a distillation of the training data such that sharing the model parameters does not raise privacy concerns at the level implicated by sharing the underlying data. The approaches disclosed herein further recognize that even if the various collaborating entities (e.g. consortium members in a previous example) are performing different computer-based modeling tasks, these tasks may employ certain common parameters. For example, parameters pertaining to population density in a city may be broadly useful for diverse city planning tasks, e.g. housing development, roadway planning, political campaigning, philanthropic activities, charity drives, and so forth. As a consequence, these parameters may be of common interest to various entities, even though the parameters may be used for different purposes by the various entities.

In some embodiments disclosed herein, parameters are shared using a Resource Description Framework (RDF), proposed by the World Wide Web Consortium (W3C) as a standard to represent metadata of the resources of the Web, became a popular model of data to expose public data on the Web. RDF employs a schema-free formalism that makes RDF a flexible description mechanism. An RDF entity is uniquely and univerally identified by a Uniform Resource Identifier (URI) that is the semantic equivalent of a web page Uniform Resource Locator (URL), but generalized to semantic concepts. The infrastructure of RDF data storage may be organized in tables of RDF triples. In the disclosed approaches, parameters are shared in a peer-to-peer (P2P) network. To share a parameter, each participant of the P2P network registers to the URIs representing parameters of interest to the participant. For example, a medical organization might be interested in URIs of diseases, symptoms, drugs and healthcare units. The participant is expected to participate in collectively building parameter vectors, also referred to as embeddings herein. Although the URI framework is convenient for this purpose, other parameter value sharing mechanisms may be employed for the P2P parameter sharing.

In the following, a global parameter vector is defined, which is optimized by the computer-based modeling P2P network as a whole. The global parameter is suitably constructed as a concatenation of multiple parameter vectors, one per entity, where an "entity" as used herein is a parameter or group of parameters with a semantic significance such that the group of parameters (if more than one) are expected to be used together. By way of an illustrative example, population density in a city may be represented by a sum of N Gaussian distributions in which each Gaussian distribution is represented by weight w, geographical center (x,y), and variance σ parameters. Thus, the city population density parameter vector $\theta_{pop}$ may be written as $\theta_{pop}=(w_1, x_1, y_1, \sigma_1, \ldots, w_N, x_N, y_N, \sigma_N)$. Generalizing, the global parameter vector $\theta:=(\theta_1, \ldots, \theta_U)$ where U is the total number of entities and $\theta_u \in \Re^{p_u}$ is the $p_u$-dimensional parameter vector associated with the entity u. Such a vector is also referred to herein as the distributed representation, or as the latent factor or the embedding, of u.

In general, it is expected that more than one individual is likely to be interested in using any given entity represented by entity parameter vector $\theta_u$ for its own specific (i.e. "local") computer-based modeling task. The term "individual" as used herein denotes a single participant in the computer-based modeling P2P network—an "individual" may in general be an institution, corporation (or division et cetera thereof), government entity, or so forth. Thus, using the previous example, one individual on the P2P network may be a government entity performing housing development planning, another individual may be a political campaign planning a canvassing effort, another individual may be a bus corporation planning bus routes, and so forth, and each of these individuals are likely to want to use the population density parameter vector $\theta_{pop}$ in their computer-based modeling task. Each individual may in general have access to some private data set(s) for use in its locally performed computer-based modeling task, which is not accessible by other individuals on the P2P network. The terms "individual" and "participant" are used interchangeably herein.

Without loss of generality, it is assumed that the P2P network has I participating individuals (i.e. I participants). Each individual, indexed by i, has a private dataset $\mathcal{D}_i=\{d_1, \ldots, d_{|\mathcal{D}_i|}\}$. In a context of predictive data analytics, the objective of individual i is to perform predictions on unseen data, that is to say find the parameters $\{\theta_i\}$ such that:

$$f_i^*(\theta^i) := \mathbb{E}_{\mathcal{D}_i : P^*}\left[\frac{1}{|\mathcal{D}_i|}\sum_{d\in\mathcal{D}_i}\ell(\theta^i; d)\right] \quad (1)$$

is minimal. The expectation is over a unknown data distribution $P^*$, but the individual i can approximate the expectation $f^*_i$ by an empirical loss suitably written as:

$$f_i(\theta^i) := \frac{1}{|\mathcal{D}_i|}\sum_{d\in\mathcal{D}_i}\ell(\theta^i; d) \quad (2)$$

Each individual i performs a (local) computer-based modeling task to minimize its own (local) loss function $f_i(\theta^i)$ and perform predictions using the value $\hat{\theta}^i$ at the minimum of this empirical loss. It is noted that the illustrative empirical loss of Expression (2) is not regularized, but a regularized loss function can be used instead, and can be preferable as providing various computational benefits.

Expression (2) can be optimized locally, using the data set $\mathcal{D}_i$ available to the individual i, and this can be independently done for each individual i=1, \ldots, I to solve I computer based modeling tasks independently. However, improved results could be obtained by combining the data sets—in the limit, operating on a data set combining $\mathcal{D}_1, \ldots, \mathcal{D}_I$. However, at least some, and possibly all, off the data sets $\mathcal{D}_1, \ldots, \mathcal{D}_I$ contain private data that is not accessible by other entities. That is, at least some data of the data set $\mathcal{D}_i$ is available only to the individual i, and is not accessible by any individual j≠i. (It is also possible that some data may be accessible to two or more individuals, for example through a consortium, but not to all I individuals—such data are still private data in that they are not accessible to all I individuals and hence limit data sharing.) Thus, the combined data set cannot be constructed in practice. It also should be noted that each individual i solves a local computer-based modeling task in which an objective of the form of the loss of Expression (2) is minimized (optionally with a regularization term), the specific (local) modeling task is generally different for each individual. Mathematically, the different modeling tasks are embodied as different loss functions $\ell(.,.)$.

In computer-based modeling P2P networks disclosed herein, these difficulties are overcome by sharing model parameters, rather than by sharing the underlying data. To this end, the individual participants agree upon the set of global parameters $\theta:=(\theta_1, \ldots \theta_U)$ that are to be shared. A computer-based modeling peer-to-peer (P2P) network of (without loss of generality) I individuals is constructed, whose collective objective is to minimize the sum of the individuals' objectives. Using the previous definition of individuals' objectives $f_i$, this can be written as:

$$\min f(\theta) \text{ where } f(\theta) := \sum_{i=1}^{I} f_i(\theta) \quad (3)$$

Performing the minimization of Expression (3) is computationally expensive. In the disclosed computer-based modeling P2P networks, the minimization Expression (3) is performed in a distributed manner by having each individual minimize its objective $f_i$ locally while sharing the shared parameters amongst other peers (individuals) of the P2P network.

With reference to FIG. 1, an illustrative computer-based modeling P2P network 10 is illustrated. FIG. 1 diagrammatically represents the P2P network by showing two representative individuals (i.e. participants) 12 labeled as "Participant A" and "Participant B"; more generally, the P2P network 10 may include two, three, four, five, ten, five, a hundred or more individuals (i.e. participants). Each participant 12 has access to private training data, i.e. private documents and annotations 14 that form the training data set. The private training data set 14 of each participant 12 is, in general, only accessible to that participant and is not accessible to other participants. However, it is also contemplated for the training data set for one or more participants to include publicly accessible data, for example from the Internet, and/or for the training data set for one or more participants to be shared with a sub-set of the other participants, for example via a contractually governed partnership or consortium. Each participant 12 performs a local computer-based modeling task diagrammatically represented in FIG. 1 by a set of parameters 16 that are optimized by the modeling performed by a local prediction service 18, which suitably operates by optimizing Expression (2) with the set of parameters $\theta^i$ being the set of parameters 16 for the individual 12. To implement the P2P network aspect, some parameters are shared parameters (more generally, at least one parameter of each locally optimized set of parameters is shared). In the representation of FIG. 1, the two representative participants (Participants A and B) share parameter vectors (i.e. entities) labeled "URI 1" and "URI 4". Other parameters may be shared with other peers (i.e. other individuals) not shown, e.g. Participant A employs a set of parameters including a parameter labeled "URI 3" that is not shared with Participant B but which may be shared with other participants (not shown) of the P2P network 10. In the illustrative P2P network 10, parameter sharing is via a global index 20 of Uniform Resource Identifier (URI) elements. The URI elements are diagrammatically indicated by name (e.g. "URI 1", "URI 2", . . . ) followed by a list of the participants registered to (and hence sharing) each URI. Here it is seen that the parameter vector indexed by "URI 3" is shared by Participants A, C, D, . . . , but is not shared by representative Participant B.

Each participant i performs a "local" computer-based modeling task entailing optimizing Expression (2) with the set of parameters $\theta^i$ (at least one of which is a shared parameter). By "local", it is meant that participant i performs its local computer-based modeling task using a computing resource or resources belonging to or controlled by participant i (that is, computing resource(s) localized to participant i), without utilizing the computing resources of other participants (except indirectly via the parameter sharing as disclosed herein). The computing resources controlled by, or belonging to, individual i are referred to herein as "computer i" or as the "local" computer or participant i, or similar phraseology, although it is to be understood that computer i may actually comprise a plurality of inter-cooperating computers which may or may not be geographically localized to any particular locale. For example, the local computer of participant i may be physically embodied by a cloud computing resource performing the computer-based modeling task of participant i under a contractual arrangement with a service provider marketing the cloud computing resource. This computer i is the local computer of participant i in the sense that the cloud computing resource belongs to or is controlled by participant i in order to perform the local computer-based modeling task of interest to participant i. Within this framework, it is contemplated that the local computer i of participant i might actually be owned by some other participant but be controlled by the participant i to perform the computer-based modeling task of participant i under a suitable service contract or the like.

Viewed another way, the local computer-based modeling task of participant i may be embodied as a non-transitory storage medium storing instructions executable by the local computer of participant i to perform the local computer-based modeling task of participant i. The non-transitory storage medium may, for example, be a hard disk or other magnetic storage medium, or a FLASH memory or other electronic storage medium, or an optical disk or other optical storage medium, various combinations thereof, or so forth.

The computer-based modeling P2P network systems and methods disclosed herein have advantages in terms of the processing speed and efficiency of the local computer. By sharing parameters, the local computer can perform its local computer-based modeling task faster and more efficiently due to its indirectly benefiting from data accessed (in effect) by way of the shared parameters. The speed and efficiency gains are achieved without adversely impacting operation of the other computers of the P2P network—indeed, each computer of the P2P network operates locally as in independent modeling and likewise benefits from data accessed indirectly by parameter sharing.

Figure 2:
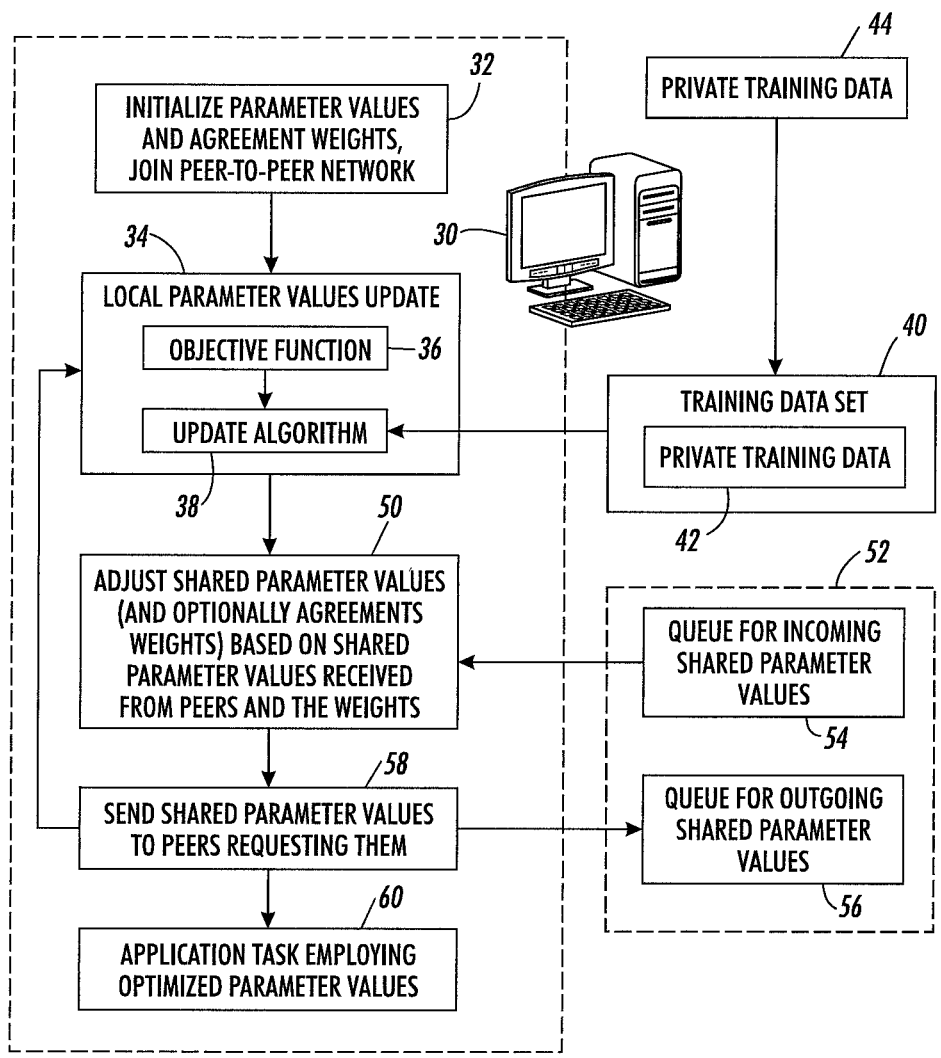
FIG. 2 diagrammatically illustrates a local computer-based modeling task suitably performed by a local computer of a participant i (i.e. P2P network node i) of the P2P network of FIG. 1.

With reference to FIG. 2 and Algorithm 1, an illustrative local computer-based modeling task performed by the local computer 30 of a participant i (i.e. P2P network node i) is described. In an operation 32 corresponding to Algorithm 1 lines 1-4, parameter values are initialized (line 4), agreement weights are initialized (line 3), and the peer-to-peer (P2P) network is joined. In an operation 34 corresponding to Algorithm 1 lines 7-8, a local parameter values update is performed in which a shared parameter $\theta_u$ is updated. In the illustrative embodiments the shared parameter $\theta_u$ is, in general, a vector or, said another way, the shared parameter $\theta_u$ is a plurality of shared parameters represented by parameter vector $\theta_u$. Typically the shared parameter $\theta_u$ corresponds to an entity u having some semantic significance. By way of illustrative example, the entity u may be population density distribution in a city, and the parameter vector $\theta_u$ may be the aforementioned population density parameter vector $\theta_{pop}=(w_1, x_1, y_1, \sigma_1, \ldots, w_N, x_N, y_N, \sigma_N)$ storing the parameters of a set of Gaussian distributions summed to represent the distribution of population density in a city. It is contemplated for the shared parameter to be a scalar (or, equivalently, a vector of a single element). In illustrative Algorithm 1 line 8, the update of shared parameter $\theta_u$ is suitably updated using a gradient descent algorithm according to $\theta_u^i \leftarrow a_u^{ii}\theta_u^i - \gamma_u^i \nabla_{\theta_u} f_i(\theta^i)$ where $f_i(\theta^i)$ denotes the objective function 36 for individual i that is functionally dependent upon the set of parameters denoted $\theta^i$, $\nabla_{\theta_u}$ denotes a gradient operator (i.e. illustrative update algorithm 38) with respect to the shared parameter $\theta_u$, and $\gamma_u^i$ denotes the step size for the iterative update which is performed at Algorithm 1 step 7. As indicated in Expression (2), the objective function 36 is also functionally dependent on the training data set $\mathcal{D}_i$ 40 which includes private training data 42 accessible only by the local computer 30 of participant i, and also may optionally include public training data 44, e.g. obtained from the public Internet. The objective function 36 quantitatively compares the model being trained at the local computer 30 with the set of training data 40. The update operation 34 updates parameter values stored at the local computer 30 (that is, updates parameter values stored in association with participant i).

In an operation 50 corresponding to Algorithm 1 steps 9-11, the parameter values of the shared parameters stored at the local computer 30 are adjusted based on parameter values of the shared parameters received at the local computer 30 from remote computer-based modeling systems via an electronic communication system 52. In illustrative embodiments, the electronic communication system 52 comprises the Internet and optionally various connecting wired and/or wireless local area networks, and includes URI's 20 for the entities (see FIG. 1), an incoming queue 54 containing shared parameter values received at the local computer 30 from other computers of the P2P network, and an outgoing queue 56 that queues parameter values being sent from the local computer 30 to other computers of the P2P network. In illustrative Algorithm 1, the parameter value $\theta_u^i$ stored at the local computer 30 is updated according to:

$$\theta_u^i \leftarrow a_u^{ii}\theta_u^i + \Sigma_{\{\theta_u^{ij} \in q_u^i\}} a_u^{ij}\theta_u^{ij} \qquad (4)$$

where $\theta_u$ denotes the shared parameter, $\theta_u^i$ is the parameter value for the shared parameter that is output by the iterative update 34 (and stored at the local computer 30), $\theta_u^{ij} \in q_u^i$ is the set of parameter values for the shared parameter received at the local computer from remote computer-based modeling systems via the electronic communication system (namely via the incoming queue 54), $a_u^{ii}$ is a weight assigned to the parameter value of the shared parameter stored at the local computer 30, and $a_u^{ij}$ is a weight assigned to the parameter value of the shared parameter received at the local computer from the $j^{th}$ remote computer-based modeling system via the electronic communication system 52 (e.g. via incoming queue 54). The weights $a_u^{ii}$ and $a_u^{ij}$ have non-negative values and preferably sum to one, that is:

$$\Sigma(a_u^{ii} + \Sigma_{\{\theta_u^{ij} \in q_u^i\}} a_u^{ij}) = 1 \quad (5)$$

In an operation 58 corresponding to Algorithm 1 line 12, the updated and adjusted shared parameters are sent to other computers on the P2P network that requested the value. These other computers are those that, along with the local computer i, are registered to the URI 20 (see FIG. 1). The outgoing queue 56 is suitably used for sending these parameters.

In illustrative Algorithm 1, the iterative update/adjust/send operations (lines 7-13) are repeated for each entity u (that is, for each shared parameter vector $\theta_u$) in accord with the for loop defined by lines 6 and 14, and then is repeated in accord with the loop defined by lines 5 and 15. In an alternative approach, all shared parameters are updated and adjusted before sending them to peers (corresponding to moving line 13 outside of the for loop defined by lines 6 and 14). Other variants are contemplated.

Illustrative Algorithm 1 assumes that all parameters of the set of parameters $\theta^i$ for individual i are shared parameters. However, in some embodiments some parameters may be unshared parameters. Such embodiments are suitably incorporated by extending the for loop defined by lines 6 and 14 to include iterations to update the unshared parameters in which the adjustment (lines 9-11) and communication (lines 12-13) are not performed.

With continuing reference to FIG. 2, after running for sufficient iterations, the iterative computer-based modeling is expected to converge to final parameter values. These parameter values define the trained (parameterized) model, which can be used for a useful purpose such as prediction in an operation 60.

---

Algorithm 1: Distributed Parameter Sharing Protocol for Peer i

1:     Local objective function $f_i$
2:     Initialize gradient steps $\gamma_u^i > 0$
3:     Initialize agreement weights $a_u^{ij}(t)$
4:     Initialize $\theta^i = 0$
5:     While TRUE do
6:       for $u \in \mathcal{U}_i$ do
7:         Update step size $\gamma_u^i$
8:         $\theta_u^i \leftarrow a_u^{ii}\theta_u^i - \gamma_u^i \nabla_{\theta_u^i} f_i(\theta^i)$
9:         Load unprocessed incoming messages in queue $q_u^i$
10:       Update weights $a_u^{ij}$
11:       $\theta_u^i \leftarrow a_u^{ii}\theta_u^i + \Sigma_{\{\theta_u^{ij} \in q_u^i\}} a_u^{ij}\theta_u^{ij}$
12:       Send $\theta_u^i$ to peers that requested it
13:       Send requests for $\theta_u^j$ to other peers
14:     end for
15:   end while

---

The disclosed computer-based modeling P2P system is a distributed architecture in which each node corresponds to an individual (where, again, the individual may be a participating corporation, government entity, non-profit organization, or so forth). This means that each individual is responsible for minimizing its own objective function $f_i$, while sharing its updates of the shared (i.e. global) parameters with other participants on the P2P network. The communication network 52 may in some embodiments use a Message Passing Interface (MPI). Timing aspects are in one suitable approach addressed as follows. Considering discrete clock times $t \in \mathbb{N}$, the following quantities are defined. For URI u, the set of times the individual i uses the parameters of individual j is denoted by $T_u^{ij}$. For each of these times, some non-negative delay is allowed in the reception of the message (for example due to the buffer of messages at node i). The lag of the message processed at time t is denoted $\delta_u^{ij}(t)$. This means that the parameter $\theta_u^i$ processed at time t was in fact the parameters of the individual j at time $t-\delta_u^{ij}$. The set of agreement weights $a_u^{ij}(t)$ are used to model the weighted combination of values arriving at individual i. The weights are non-negative and sum to one, i.e. $\Sigma_{j=1}^I a_u^{ij}(t)=1$ for any $i \in \{1, \ldots, I\}$ and any $t \in \mathbb{N}$. In some typical embodiments, $a_u^{ii}(t) \gg a_u^{ij}(t)$ for all $j \neq i$. For example, $a_u^{ii}(t) \geq 0.8$ is contemplated, with the balance satisfying Expression (5) and $\Sigma_{j \neq i} a_u^{ij}(t) \leq 0.2$. The weights for other parameter values received from other participants may be chosen based on various factors, such as the perceived reliability of the other participant (perhaps based on the data set size owned by the other participant), the extent to which data belonging to the other participant is believed to be complementary to the private data at participant i (higher weight being assigned to parameter values from other participants believed to have complementary data that "fills in" areas for which the private data of participant i is believed to be deficient), or so forth.

Algorithm 1 is suitably performed by each individual $i=1, \ldots, I$, and the P2P network in this case is expected to converge to $\min_\theta \Sigma_{i=1}^n f_i(\theta)$ under most conditions satisfying the following: (1) The function to optimize is differentiable almost everywhere on its domain with finite derivatives; (2) The approximate gradients on average are in the direction of the exact gradient (as in classical stochastic gradient descent, SGD); (3) Regular messages are sent by every node of the P2P network (that is, no participant stops working before the convergence has been reached); (4) The size of the gradient steps is in accord with classical stochastic convergence assumptions, e.g. $\Sigma_t \gamma_t = \infty$, $\Sigma_t \gamma_t^2 < \infty$; (5) The P2P network is fully connected, that is, a path exists between any two nodes of the message passing graph; and (6) The lag of the messages is bounded in that, once a message has been sent by a node, it is incorporated by the recipient node in a finite time.

With reference back to FIG. 1, each participant 12 has a private dataset $\mathcal{D}_i$ 14. Participants register on the P2P network 10 by publishing the list of URIs in which they desire to share in the global index 20. This global index 20 enable the other participants of the P2P network 10 to identify who to contact to ask for shared parameters. For example, a company interested in healthcare might identify all the URIs related to the healthcare domain and for each of these URIs, list all the peers that are willing to share their parameters. Given the global index 20 (suitably implemented on a central server, or using a distributed index such as elastic net), the P2P network 10 is created by the participation of some peers who apply the following protocol: (1) Once registered on the network, a peer i asks for the embeddings of one or more entities from peer j; (2) peer j receives the parameters of peer i, updates its own parameters and sends them back to peer i; (3) peer i receives the updated parameters of peer j and updates its own parameters. These steps can be repeated an arbitrary number of times, and the peers will not communicate in general to a single peer, but to a large number of peers interested in similar entities, as indicated in the URI peer registration lists shown in diagrammatic block 20 of FIG. 1. The updating phases (2) and (3) merge the information coming from the two participants of the P2P network. In this way, the P2P network can implement a simple distributed algorithm minimizing $\Sigma f_i$, where each $f_i$ is a private objective function known only to participant i.

Figure 3:
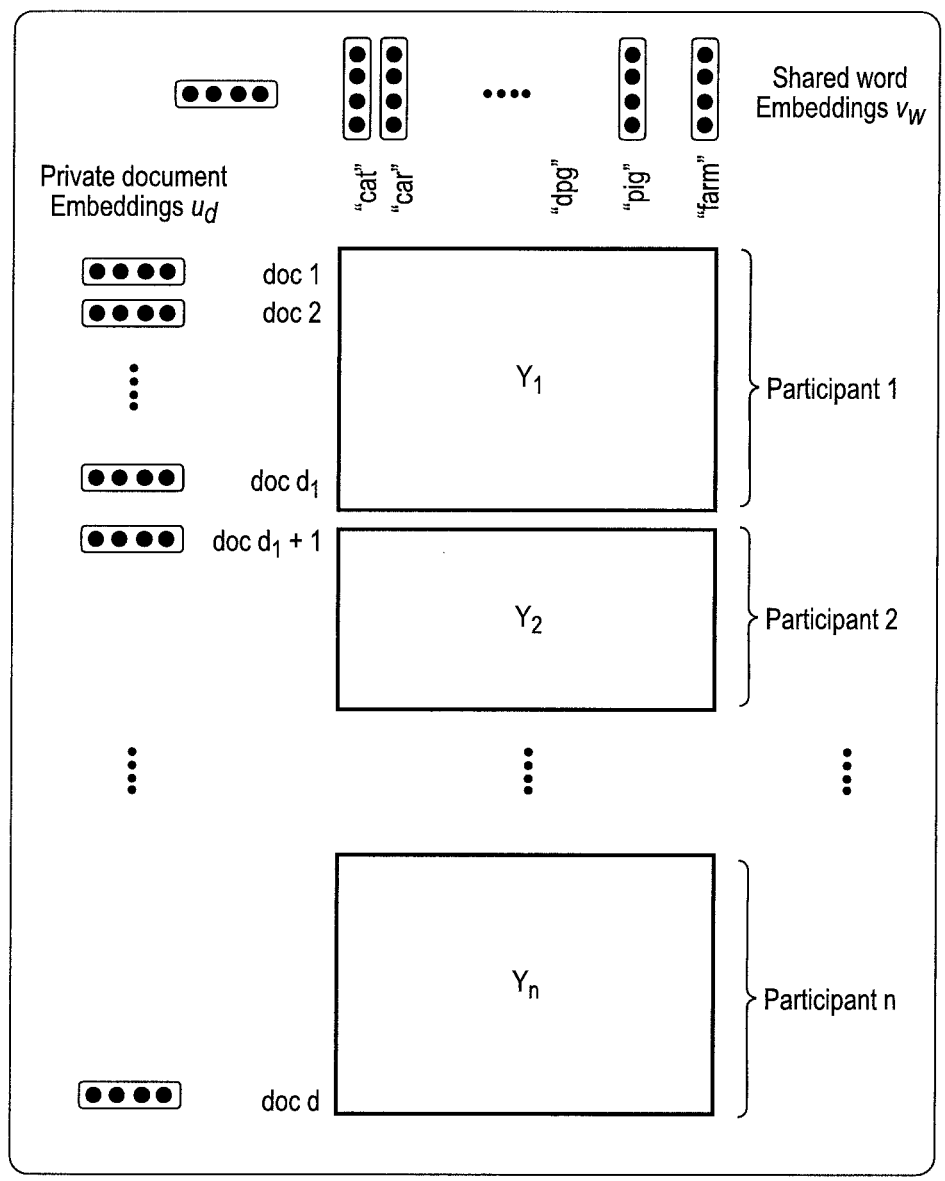
FIG. 3 diagrammatically illustrates a matrix factorization model applied on a term frequency inverse document frequency (TF-IDF) document-term matrix of a document using the computer-based modeling P2P network of FIG. 1.

With reference to FIG. 3, application of the disclosed computer-based modeling P2P network to matrix factorization modeling of text-based documents, for example to perform document indexing/archiving or document retrieval, is described. Textual data are often sensitive data that are difficult to share because they can contain valuable information. However, many machine learning applications are very useful when applied to textual data, including text categorization and clustering. A useful model to share among participants is Latent Semantic Analysis (LSA), which is a matrix factorization model applied on the term frequency inverse document frequency (TF-IDF) document-term matrix of a document. For simplicity, binarized bag-of-words document representations are considered here to represent documents (i.e. repeated words are counted once so that the weights corresponding to term frequencies do not need to be computed). Without loss of generality, it is assumed that there are K participants, each of them having $d_i$ documents, i=1, . . . , n, and it is further assumed that there are |W| words in the vocabulary set W. Each participant has a document-term matrix $Y_i \in \mathfrak{R}^{d_i \times m}$. The concatenation of all these matrices gives the matrix $Y \in \mathfrak{R}^{d \times m}$, where $d = \Sigma_{i=1}^{n} d_i$ is the total number of private documents. Following Expression (3), the joint objective function is $f(\theta) = \Sigma_{i=1}^{n} f_i(\theta; Y_i)$. Here, the parameter set $\theta = (U, V)$ contains a matrix $U \in \mathfrak{R}^{D \times R}$ of document embeddings $u_d \in \mathfrak{R}^R$ as rows, and a matrix $V \in \mathfrak{R}^{m \times R}$ of word embeddings $v_w \in \mathfrak{R}^R$. The rank R is pre-defined and corresponds to the model complexity. The predictive model corresponds to dot products between document embeddings, leading to (private) local objective functions $f_i$ defined as:

$$f_i(U, V) := \sum_{(d,w) \in \Omega_i} (u_d^T v_w - y_{dw})^2 \qquad (6)$$

where $\Omega_i$ is the set of document-term pairs that are known to participant i, i.e. the private data of the i-th participant. Hence, the functions $f_i$'s correspond to the quadratic prediction loss between the model and the data. This model is illustrated by FIG. 3, where it is seen that some of the parameters are private (namely the document embeddings, which are likely to contain information participant i may not wish to share with other P2P network participants), but the word embeddings are shared among participants through unique identifiers (mainly specified by their character string).

More generally, the iterative update is a matrix factorization update factorizing a matrix $Y_i$ representing the set of training data into factor matrices $U_i$ and $V_i$ defined by the set of parameters $\theta^i$ to optimize an objective function $f_i(\theta^i)$ quantifying a difference $|U_i V_i - Y_i|$. The training data suitably comprises text-based documents, the matrix $Y_i$ represents the text-based documents as a document-word matrix, the factor matrix $U_i$ comprises parameters of the set of parameters representing document embeddings which are not shared parameters, and the factor matrix $V_i$ comprises parameters of the set of parameters representing word embeddings which are the shared parameters of the set of parameters.

To test illustrative embodiments of the disclosed techniques, the following experiments were performed. Email data is a rich source of private information. The parameter sharing P2P network approach is tested using the Enron email dataset, which is a corpus of 600,000 emails generated by 158 employees of the Enron Corporation. The following experiments were performed using three settings.

First, in the Centralized Corpus case, a unique corpus of emails was used to produce a distributed representation of the words, using the document-term matrix of the emails. This approach assumes no private data, that is, the data set is merged as can be done if it is all public data.

Second, in the Independent Learning of Separated Corpora case, the distributed representations of the words were produced individually on the document-term matrix of each mailbox without sharing of word embeddings between the mailboxes. This approach assumes private data sets with no sharing of either data or model parameters.

Finally, the Joint Learning of Separated Corpora case corresponds to the disclosed computer-based modeling P2P network approach in which data remains private but parameter values are shared. In this case, the embeddings were computed using Algorithm 1.

For all three cases, the vocabulary used for each index was chosen by using the unique corpus setting. The vocabulary was chosen based on the TF-IDF criteria and then the document-term matrices were built using a binary type of indicator. For this experiment a set of 50 Enron mailboxes were randomly chosen and a finite set of 4000 unigrams were used as the vocabulary. The employed corpus contained a total of 111056 messages.

Table 1 presents the area under the precision recall curve (average precision) obtained in the three cases. In each case, a ten-fold cross validation was performed over each corresponding corpora. As expected, the best performance was obtained in the unique corpus case, since this approach allows complete sharing of data (no privacy). However, the shared configuration of Algorithm 1 showed increased performance compared to the unique case, while maintaining data privacy as disclosed herein.

TABLE 1

| Algorithm | Prediction accuracy |
|---|---|
| Centralized Corpus | 0.86 ± 0.02 |
| Independent Learning of Separated Corpora | 0.77 ± 0.05 |
| Joint Learning of Separated Corpora | 0.81 ± 0.03 |

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A non-transitory storage medium storing instructions executable by a local computer to perform iterative computer-based modeling in conjunction with remote computers connected with the local computer as a peer-to-peer (P2P) network, the iterative computer-based modeling including the operations of:

receiving, at the local computer, parameter values of shared parameters from the remote computers via the P2P network;

storing, at the local computer, parameter values for a set of parameters including at least the shared parameters;

performing an iterative gradient step update to update the parameter values of the set of parameters stored at the local computer, the iterative gradient step updates of the iterative computer-based modeling operating to optimize an objective function that is not known to the remote computers and that is functionally dependent upon the set of parameters wherein the objective function quantitatively compares a model with a set of training data including at least some training data accessible by the local computer that are not accessible by the remote computers;

adjusting the parameter values of the shared parameters stored at the local computer by averaging parameter values of the shared parameters received at the local computer from remote computers via the P2P network wherein the adjusting comprises adjusting the parameter value $\theta_u^i$ stored at the local computer of each shared parameter $\theta_u$ by averaging the parameter values $\theta_u^{ij} \in q_u^i$ of the shared parameter $\theta_u$ received at the local computer from the remote computers according to:

$$\theta_u^i \leftarrow a_u^{ii} \theta_u^i + \Sigma_{\{\theta_u^{ij} \in q_u^i\}} a_u^{ij} \theta_u^{ij}$$

where $\theta_u$ denotes the shared parameter, $\theta_u^i$ is the parameter value for the shared parameter stored at the local computer, $q_u^i$ is the set of parameter values for the shared parameter $\theta_u$ received at the local computer from remote computers via the P2P network, $a_u^{ii}$ is a weight assigned to the parameter value of the shared parameter stored at the local computer, and $a_u^{ij}$ is a weight assigned to the parameter value of the shared parameter $\theta_u$ received at the local computer from the $j^{th}$ remote computer via the P2P network; and sending the parameter values of the shared parameters stored at the local computer from the local computer to the remote computers via the P2P network.

2. The non-transitory storage medium of claim 1 wherein each iteration of the iterative modeling process includes performing an iterative gradient step update, adjusting the parameter values, and sending the parameter values.

3. The non-transitory storage medium of claim 2 wherein in each iteration of the iterative modeling process the sending is performed after the adjusting and comprises sending the adjusted parameter values.

4. The non-transitory storage medium of claim 1 wherein $$\Sigma(a_u^{ii} + \Sigma_{\{\theta_u^{ij} \in q_u^i\}} a_u^{ij}) = 1$$

and the weights $a_u^{ii}$ and $a_u^{ij}$ have non-negative values.

5. The non-transitory storage medium of claim 1 wherein the iterative gradient step update comprises updating the parameter value $\theta_u^i$ stored at the local computer for each shared parameter $\theta_u$ according to:

$$\theta_u^i \leftarrow a_u^{ii} \theta_u^i - \gamma_u^i \nabla_{\theta_u^i} f_i(\theta^i)$$

where $f_i(\theta^i)$ denotes the objective function that is functionally dependent upon the set of parameters denoted $\theta^i$, $\nabla_{\theta_u}$ denotes a gradient operator with respect to the shared parameter $\theta_u$, and $\gamma_u^i$ denotes a step size for the iterative gradient step update.

6. The non-transitory storage medium of claim 1 wherein the iterative gradient step update comprises a matrix factorization update factorizing a matrix $Y_i$ representing the set of training data into factor matrices $U_i$ and $V_i$ defined by the set of parameters $\theta^i$ to optimize an objective function $f_i(\theta^i)$ quantifying a difference $|U_i V_i - Y_i|$.

7. The non-transitory storage medium of claim 6 wherein the training data comprises text-based documents, the matrix $Y_i$ represents the text-based documents as a document-word matrix, the factor matrix $U_i$ comprises parameters of the set of parameters representing document embeddings which are not shared parameters, and the factor matrix $V_i$ comprises parameters of the set of parameters representing word embeddings which are the shared parameters of the set of parameters.

8. A computer-based modeling system comprising:
a plurality of computers interconnected as a peer-to-peer (P2P) network to send parameter values of one or more shared parameters between sender and recipient computers of the P2P network, wherein each computer of the P2P network is programmed to perform an iterative computer-based modeling task defined by a set of training data including at least some training data that are not accessible to the other computers of the P2P network and by a set of parameters including the one or more shared parameters, the iterative computer-based modeling task optimizing an objective function that is not known to the other computers of the plurality of computers and that quantitatively compares a model parameterized by the set of parameters with the set of training data, wherein each iteration of the iterative computer-based modeling task includes:

storing, at the computer, parameter values for a set of parameters including at least the one or more shared parameters;

performing an iterative gradient step update of the parameter values of the set of parameters stored at the computer based on the objective function;

receiving, at the computer, parameter values of the one or more shared parameters of the set of parameters from other computers of the plurality of computers via the P2P network;

adjusting the parameter values of the one or more shared parameters stored at the computer by averaging the received parameter values of the one or more shared parameters wherein the adjusting comprises adjusting the parameter value $\theta_u^i$ stored at the computer of each shared parameter $\theta_u$ by averaging the parameter values $\theta_u^{ij} \in q_u^i$ of the shared parameter $\theta_u$ received at the local computer from the other computers according to:

$$\theta_u^i \leftarrow a_u^{ii} \theta_u^i + \Sigma_{\{\theta_u^{ij} \in q_u^i\}} a_u^{ij} \theta_u^{ij}$$

where $\theta_u$ denotes the shared parameter, $\theta_u^i$ is the parameter value for the shared parameter stored at the computer, $q_u^i$ is the set of parameter values for the shared parameter $\theta_u$ received from the other computers during the receiving operation, $a_u^{ii}$ is a weight assigned to the parameter value $\theta_u^i$ stored at the computer of the shared parameter $\theta_u$ stored at the computer, and $a_u^{ij}$ is a weight assigned to the parameter value $\theta_u^{ij}$ of the shared parameter $\theta_u$ received during the receiving operation from a $j^{th}$ other computer of the P2P network; and sending the parameter values of the one or more shared parameters stored at the computer to the other computers of the P2P network.

9. The computer-based modeling system of claim 8 wherein in each iteration of the computer-based modeling the adjusting is performed after the iterative gradient step update and the sending is performed after the adjusting.

10. The computer-based modeling system of claim 8 wherein $$\Sigma(a_u^{ii} + \Sigma_{\{\theta_u^{ij} \in q_u^i\}} a_u^{ij}) = 1$$

and the weights $a_u^{ii}$ and $a_u^{ij}$ have non-negative values.

11. The computer-based modeling system of claim 8 wherein the iterative gradient step update comprises a matrix factorization update factorizing a matrix $Y_i$ representing the set of training data into factor matrices $U_i$ and $V_i$ defined by the set of parameters $\theta^i$ to optimize an objective function $f_i(\theta^i)$ quantifying a difference $|U_i V_i - Y_i|$.

12. The computer-based modeling system of claim 11 wherein the training data comprises text-based documents, the matrix Y represents the text-based documents as a document-word matrix, the factor matrix $U_i$ comprises parameters of the set of parameters representing document embeddings which are not shared parameters, and the factor matrix $V_i$ comprises parameters of the set of parameters representing word embeddings which are the shared parameters of the set of parameters.

13. The computer-based modeling system of claim 8 wherein two computers of the P2P network are programmed to perform iterative computer-based modeling tasks with different models parameterized by different sets of parameters having at least one shared parameter in common.

14. The computer-based modeling system of claim 8 wherein each shared parameter is represented as a Uniform Resource Identifier (URI), and the receiving and sending operations each comprise accessing the one or more URIs representing the one or more shared parameters.

15. A method performed in conjunction with a plurality of computers interconnected as a peer-to-peer (P2P) network, the method comprising:
at each computer of the P2P network, performing an iterative computer-based modeling task using the computer to optimize an objective function that is not known to the other computers of the plurality of computers and that quantitatively measures the fit of a model parameterized by a set of parameters including one or more shared parameters to a set of training data including at least some training data not accessible by the other computers of the P2P network, wherein each iteration of the iterative computer-based modeling task includes:
storing, at the computer, parameter values for a set of parameters including at least the one or more shared parameters;
performing an iterative gradient step update of parameter values of the set of parameters stored at the computer to improve the fit of the model to the set of training data as measured by the objective function;
receiving, at the computer, parameter values of the one or more shared parameters from other computers of the plurality of computers via the P2P network;
after performing the iterative gradient step update, adjusting the parameter value $\theta_u^i$ stored at the computer of each shared parameter $\theta_u$ by averaging the parameter values $\theta_u^{ij} \in q_u^i$ of the shared parameter $\theta_u$ received at the computer from the other computers according to:

$$\theta_u^i \leftarrow a_u^{ii}\theta_u^i + \Sigma_{\{\theta_u^{ij} \in q_u^i\}} a_u^{ij}\theta_u^{ij}$$

where $\theta_u$ denotes the shared parameter, $\theta_u^i$ is the parameter value for the shared parameter stored at the computer, $q_u^i$ is the set of parameter values for the shared parameter received from the other computers during the receiving operation, $a_u^{ii}$ is a weight assigned to the parameter value $\theta_u^i$ stored at the computer of the shared parameter $\theta_u$, and $a_u^{ij}$ is a weight assigned to the parameter value $\theta_u^{ij}$ of the shared parameter $\theta_u$ received during the receiving operation from a $j^{th}$ other computer of the P2P network; and
after performing the adjusting, sending the parameter values of the one or more shared parameters stored at the computer to the other computers of the P2P network.

16. The method of claim 15 wherein the iterative computer-based modeling task comprises matrix factorization of a matrix $Y_i$ representing the set of training data into factor matrices $U_i$ and $V_i$ defined by the set of parameters, and the objective function measures the fit of the product $U_i V_i$ to the matrix K.

17. The method of claim 16 wherein the training data comprises text-based documents and the matrix $Y_i$ represents the text-based documents as a document-word matrix.

18. The method of claim 15 wherein different computers of the P2P network perform generally different iterative computer-based modeling tasks with generally different models parameterized by generally different sets of parameters but having some shared parameters in common.

* * * * *